(12) United States Patent
Williams

(10) Patent No.: US 7,069,134 B2
(45) Date of Patent: Jun. 27, 2006

(54) VEHICLE CONTROL SYSTEM AND METHOD OF OPERATING THE SAME

(75) Inventor: Kyle Williams, Shelby Township, MI (US)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 10/996,109

(22) Filed: Nov. 23, 2004

(65) Prior Publication Data

US 2006/0111829 A1   May 25, 2006

(51) Int. Cl.
*B60T 7/12* (2006.01)
*G05D 1/00* (2006.01)

(52) U.S. Cl. ............... 701/79; 701/29; 340/442; 340/444; 340/438; 340/439; 340/825.36

(58) Field of Classification Search ............... 701/1, 701/24, 29, 41, 79; 340/442, 443, 444, 445, 340/438, 439, 825.36
See application file for complete search history.

(56) References Cited

U.S. PATENT DOCUMENTS

| | | | |
|---|---|---|---|
| 5,289,160 A | 2/1994 | Fiorletta | |
| 5,696,681 A | 12/1997 | Hrovat et al. | |
| 5,826,210 A | 10/1998 | Izumi et al. | |
| 6,182,021 B1 | 1/2001 | Izumi et al. | |
| 6,404,330 B1 | 6/2002 | Sugisawa | |
| 6,445,286 B1 | 9/2002 | Kessler et al. | |
| 6,498,967 B1 | 12/2002 | Hopkins et al. | |
| 6,510,375 B1 | 1/2003 | Faye | |
| 6,691,059 B1 | 2/2004 | Griesser | |
| 6,696,934 B1 | 2/2004 | Sugisawa | |
| 6,980,925 B1 * | 12/2005 | Zheng et al. | ............... 702/175 |
| 2003/0201880 A1 | 10/2003 | Lu | |

* cited by examiner

*Primary Examiner*—Gertrude A. Jeanglaude
(74) *Attorney, Agent, or Firm*—Michael Best & Friedrich LLP

(57) ABSTRACT

A tire blowout control system for a vehicle that has multiple wheels. Each of the wheels has a tire. The system includes a wheel speed sensor and a pressure sensor. The system also includes a first processor to receive the wheel speed, and a second processor to receive the pressure signals. The system also includes a third processor to receive signals from the first processor and the second processor, to generate a tire blowout signal based on the signals from the first processor and the second processor, and to activate an active safety system and a passive safety system with the tire blowout signal.

23 Claims, 3 Drawing Sheets

VEHICLE CONTROL SYSTEM AND METHOD OF OPERATING THE SAME

BACKGROUND

The invention relates to a vehicle control system, and more particularly to a vehicle control system for detecting a tire blowout and controlling the vehicle in response to the tire blowout.

SUMMARY

In one form, the invention provides a control system for a vehicle that has multiple wheels. Each of the wheels has a tire. The system includes a wheel speed sensor associated with each wheel. Each wheel speed sensor is configured to generate a wheel speed signal that indicates a speed for its respective wheel. The system also includes a pressure sensor associated with each tire. Each pressure sensor is configured to generate a pressure signal that indicates a tire pressure for its respective tire. The system can also include a plurality of processors. For example, and in one construction, the system includes a first processor to receive the wheel speed signals, and to generate a first processed signal when one of the signals indicates that one of the wheels has a speed that is different from the speeds of the other wheels. The system can also include a second processor to receive the pressure signals, and to generate a second processed signal when one of the pressure signals indicates that one of tires has a pressure that abruptly changes. The system can also include a third processor to receive the first and second processed signals, to generate a tire blowout signal when both the first and second processed signals have been generated, and to activate at least one of an active safety system and a passive safety system with the tire blowout signal.

In another form, the invention provides a control system for a vehicle having multiple wheels. Each of the wheels has a tire. The system includes first and second means for sensing a wheel speed associated with first and second wheels, respectively, and for generating first and second wheel speed signals, respectively, indicative of a speed for each wheel. The system also includes a first and second means for sensing a tire pressure associated with first and second tires, respectively, and for generating first and second a pressure signals, respectively, indicative of a tire pressure for each tire. Furthermore, the system also includes a means for processing both the wheel speed signals and the tire pressure signals, for generating a tire blowout signal based on the wheel speed signals and the tire pressure signals, and for selectively activating at least one of an active safety system and a passive safety system based on the tire blowout signal.

In another form, the invention provides a method for controlling a vehicle having multiple wheels. Each wheel has a tire. The method includes determining a wheel speed associated with each wheel, determining a tire pressure associated with each tire, and generating a tire blowout signal when one of the wheel speeds is different from the other wheel speeds and when the tire pressure of the wheel having a different wheel speed abruptly changes. The method also includes activating at least one of a passive safety system and an active safety system with the tire blowout signal.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "supported," and "mounted" and variations thereof herein are used broadly and encompass direct and indirect connections, couplings, supports, and mountings. In addition, the terms "connected" and "coupled" and variations thereof are not restricted to physical or mechanical connections or couplings.

DETAILED DESCRIPTION

Figure 1:
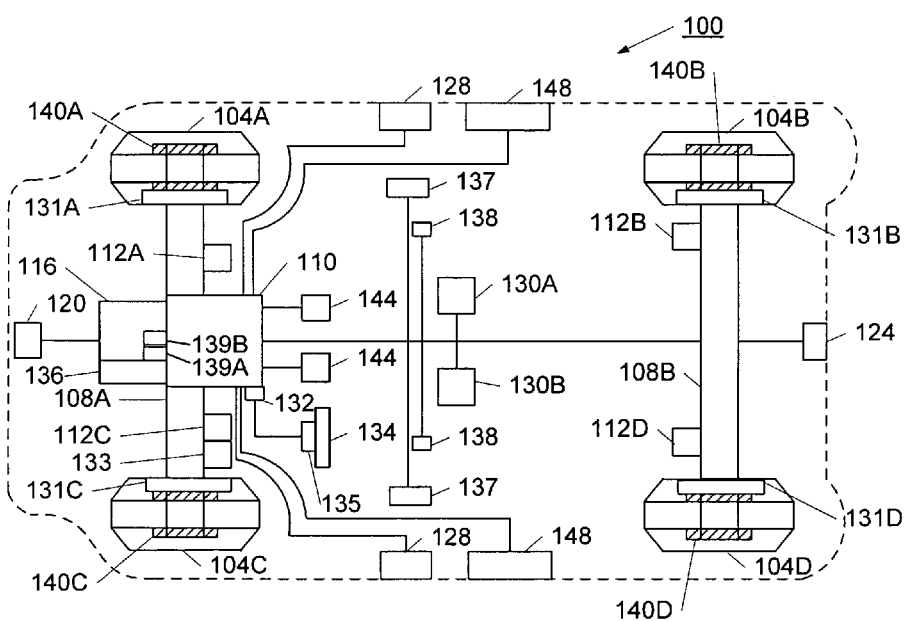
FIG. 1 shows a schematic plan view of a vehicle.

FIG. 1 shows a schematic plan view of a vehicle 100. The vehicle 100 has four wheels 104A, 104B, 104C, and 104D. The wheels 104A, 104B, 104C, and 104D are connected to two axles 108A and 108B which are connected to an engine 110, as shown. The four wheels are monitored by a plurality of wheel speed sensors 112A, 112B, 112C, and 112D. The wheel speed sensors 112A, 112B, 112C, and 112D are coupled to an electronic processing unit ("ECU") 116. Each of the wheels also has a tire mounted thereon. The vehicle 100 can include other sensors such as a front bumper sensor 120, a back bumper sensor 124, a plurality of side impact sensors 128, and a plurality of accelerometers 130A and 130B. In some constructions, the vehicle 100 also includes a plurality of tire pressure sensors 131A, 131B, 131C, and 131D, a steering wheel angle sensor 132, a road wheel angle sensor 133, a steering torque sensor 134, and a steering pressure sensor 135. The vehicle 100 can also include an engine speed sensor 136, a plurality of seat belt buckle switches/sensors 137, and a plurality of occupant detection sensors 138. Although these sensors are all shown in the vehicle 100, some constructions of the vehicle 100 can include more or less sensors. It is also envisioned that the vehicle can have more or less wheels than the four wheels 104A, 104B, 104C, and 104D shown.

The wheel speed sensors 112A, 112B, 112C, and 112D, the front bumper sensor 120, the back bumper sensor 124, the side impact sensors 128, the accelerometers 130A and 130B, the seat belt buckle sensors 137, and the occupant detection sensors 138 are shown as individual sensors. However, these sensors 112A, 112B, 112C, 112D, 120, 124, 128, 130A, 130B, 137, and 138 can be combined and/or include multiple sensors in a plurality of sensor arrays coupled to the ECU 116. Other sensor types such as thermal sensors can also be used in the vehicle 100.

The vehicle 100 can also include a plurality of active and passive safety controls 139A and 139B. The active and passive safety controls 139A and 139B can be used to control the stability of the vehicle 100 or to activate a plurality of occupant protection devices. As shown in FIG. 1, the active safety control 139A includes, an anti-lock brake control 139 that controls a plurality of brakes 140A, 140B, 140C, and 140D. Also as shown in FIG. 1, the passive safety control includes a restraint device control that controls a deployment of restraint devices of the vehicle 100, such as front airbags 144 and side airbags 148. Although FIG. 1 shows only airbag restraint devices, other types of restraint devices, such as seatbelt pretensioners and head and torso airbags, can be used in the vehicle 100.

The electronic processing unit 116 receives inputs from the sensors such as the wheel speed sensors 112A, 112B, 112C, and 112D, the front bumper sensor 120, the back bumper sensor 124, the side impact sensors 128, the accelerometers 130A and 1301B, the tire pressure sensors 131A, 131lB, 131C, and 131D, the steering wheel angle sensor 132, the road wheel angle sensor 133, the steering torque sensor 134, the steering pressure sensor 135, the engine speed sensor 136, the seat belt buckle sensors 137, and the occupant detection sensors 138.

In one construction, each of the accelerometers 130A and 130B detects and monitors a condition of the vehicle 100. For example, the accelerometers 130A and 130B are used to sense a condition of the vehicle 100 that is indicative of an amount of acceleration experienced by the vehicle 100. In other constructions, the sensors 130A and 130B can detect the motion of the vehicle 100, and transduce and convert the signals into signals indicative of acceleration of the vehicle 100. If the sensors 130A and 130B are equipped with calibration circuitry or microprocessors therein, the motions can be converted internally to a calibrated form. Otherwise, the conditions can be converted into calibrated signals by other external processes in a manner known in the art. Furthermore, other sensors, such as the front bumper sensor 120, the back bumper sensor 124, the side-impact sensors 128, can be used to detect or sense events such as crashes and collisions.

Sensors such as the wheel speed sensors 112A, 112B, 112C, and 112D detect and monitor a condition of each of the wheels 104A, 104B, 104C, and 104D that is indicative of an amount of velocity experienced by the vehicle 100. Sensors such as tire pressure sensors 131A, 131B, 131C, and 131D detect and monitor a pressure condition of each of the tires mounted on the wheels 104A, 104B, 104C, and 104D. Sensors such as the steering wheel angle sensor 132, the road wheel angle sensor 133, the steering torque sensor 134, the steering pressure sensor 135, and the engine speed sensor 136 are configured to detect a plurality of conditions. For example, the steering pressure sensor 135 detects a pressure experienced by a steering wheel of the vehicle 100. Collectively, values of the signals output by the sensors 112A, 1112B, 112C, 112D, 120, 124, 128, 130A, 130B, 137, and 138 are referred to as sensed values, or values hereinafter.

Figure 2:
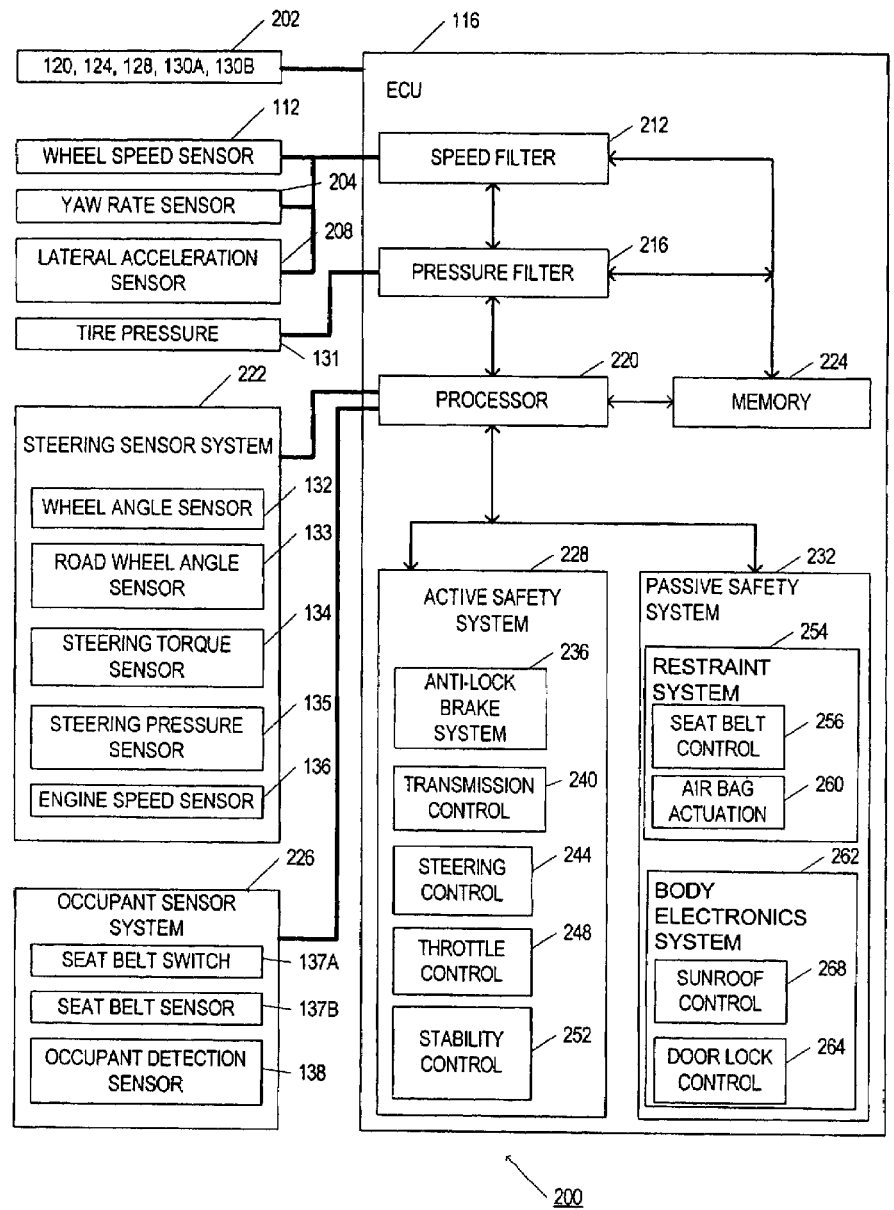
FIG. 2 shows a block diagram of a control system in the vehicle of FIG. 1.

FIG. 2 shows a control system 200 used in the vehicle 100 of FIG. 1 in block diagram format. In addition to the sensors 112 (including 112A, 112B, 112C and 112D), 202 (including 120, 124, 128, 130A, and 130B), 131 (including 131A, 131B, 131C, 131D), 137A, 137B, and 138 described previously, the control system 200 also includes a yaw rate sensor 204, and a lateral acceleration sensor 208. The yaw rate sensor 204 is configured to detect and monitor a condition of the vehicle 100 that is indicative of an amount of yaw rate experienced by the vehicle 100. Similarly, the lateral acceleration sensor 208 is configured to detect and monitor a condition of the vehicle 100 that is indicative of an amount of lateral acceleration experienced by the vehicle 100.

The ECU 116 includes a speed filter or processor 212 that receives data from the wheel speed sensor 112, the yaw rate sensor 204, and the lateral acceleration sensor 208. The speed filter 212 then processes the received data to ensure that intermittent wheel speed changes due to potholes and loss of traction are not incorrectly interpreted as a likely tire blowout. Similarly, the ECU 116 also includes a pressure filter or processor 216 that receives pressure data from the tire pressure sensor 131 (including 131A, 131B, 131C, and 131D). The pressure filter 216 then processes the filtered pressure data to ensure that intermittent tire pressure changes due to bumps and potholes are not incorrectly interpreted as a likey tire blowout.

The ECU 116 also includes a third processor 220 that receives the values from the filters 212 and 216, a steering sensor system 222 (including the wheel angle sensor 132, the road wheel angle sensor 133, the steering torque sensor 134, the steering pressure sensor 135, and the engine speed sensor 136), and from an occupant sensor system 226 (including the seat belt switch 137A, the seat belt sensor 137B, and the occupant detection sensor 138). Although the filters 212 and 216 are shown being external from the third processor 220, the filters 212 and 216 can also be integrated with the third processor 220. The third processor 220 can be a general-purpose micro-controller, a general-purpose microprocessor, a dedicated microprocessor or controller, a signal processor, an application-specific-integrated circuit ("ASIC"), or the like.

In some constructions, the control system 200 and its functions described are implemented in a combination of firmware, software, hardware, and the like. As illustrated in FIG. 2, the third processor 220 communicates with other modules (discussed below) that are drawn as if these modules were implemented in hardware. However, the functionality of these modules could be implemented in software, and that software could, for example, be stored in a memory 224 and executed by the third processor 220. Although the memory 224 is shown as being external to the third processor 220, the memory 224 can also be internal to the third processor 220. In some constructions, the ECU 116 is integrated into an existing ECU of the vehicle 100. In some other constructions, the ECU 116 is implemented as a stand-alone ECU that is coupled to the existing ECU. In such cases, the stand-alone ECU processes the signals from the sensors and makes decisions about which of the safety systems is to be activated and to what extent the safety systems are to be activated. The stand-alone ECU can then directly actuate one or more of the electromechanical devices detailed hereinafter. In yet some other constructions, the stand-alone ECU sends a signal to the existing ECU that controls the electromechanical device, and the existing ECU can then actuate the device.

In the construction illustrated, the ECU 116 also includes an active safety system 228 (139A of FIG. 1) and a passive safety system 232 (139B of FIG. 1). The active safety system 228 includes, without limitation, an anti-lock braking system 236, an electronic transmission control system 240, an electronic steering control system 244, an electronic throttle control system 248, and an electronic stability control system 252. The passive safety system 232 includes, without limitation, an electronic restraint system 254 that further includes a seat belt control system 256 and an air bag activation system 260. The passive safety system 232 also includes a body electronics system 262 that further includes a door lock control system 264 and sunroof control system 268. Although the active safety system 228 and the passive safety system 232 are shown being internal to or integrated with the ECU 116, the active safety system 228 and the passive safety system 232 can also be external to the ECU 116. Furthermore, each of the anti-lock braking system 236, transmission control system 240, the steering control system 244, the throttle control system 248, and the electronic stability control system 252 can have its respective processing unit. Similarly, each of the restraint system 254 and the body electronics system 262 can also have its respective processing unit.

In some constructions, the anti-lock braking system 236 is used to apply brakes 140A, 140B, 140C, and 140D to all wheels 104A, 104B, 104C, and 104D in order to reduce vehicle speed. The electronic stability control 252 is used to apply brakes 140A, 140B, 140C, and 140D to individual wheels 104A, 104B, 104C, and 104D in order to stabilize the vehicle 100 (by reducing a vehicle slip angle and the yaw rotation rate). The electronic throttle control 248 is used to reduce engine speed in order to reduce the vehicle speed. The electronic steering control 244 is used to prevent abrupt changes in steering angle during a tire blowout and to assist a driver in steering control. The electronic transmission control 240 is used to lower a transmission gear of the vehicle 100 in order to reduce the vehicle speed. Furthermore, each of the systems 236, 240, 244, 248, and 252 can be connected to its respective electromechanical device such as the brakes 140A, 140B, 140C, and 140D, the engine 110, and the transmission. In some constructions, the electronic restraint system 254 is used to deploy the airbags and the seatbelt pretensioners to protect an occupant from injury. The body electronics system 262 can be used to lock the doors, to close the windows, and to close the sunroof to protect the occupant from injury.

Figure 3:
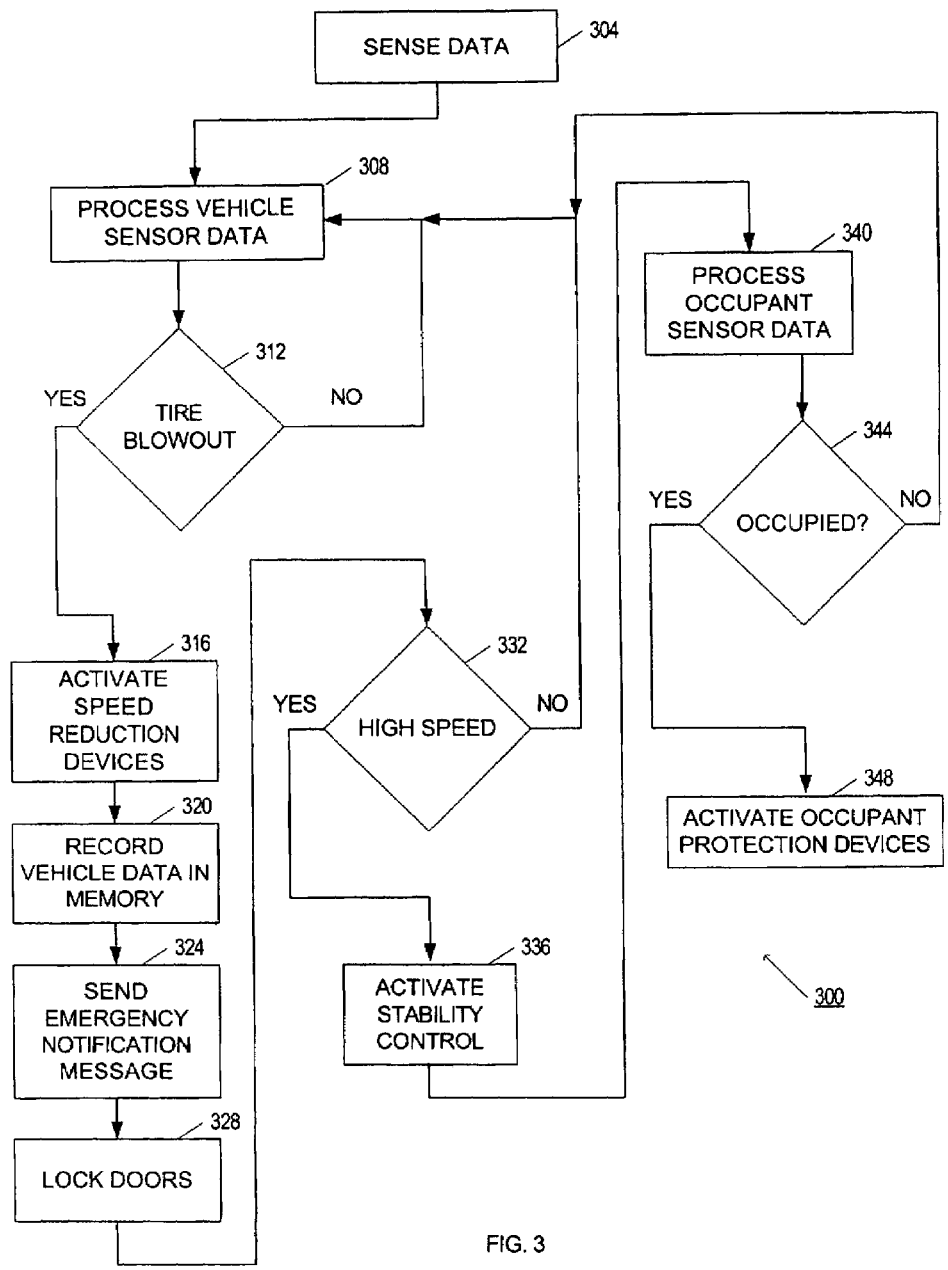
FIG. 3 is a flow chart of processing carried out in embodiments of the invention.

FIG. 3 shows a flow chart 300 that further illustrates the processes that occur in some constructions, including processes that may be carried out by software, firmware, or hardware. As noted, the sensors sense accelerations, wheel speeds, engine speeds, and other parameters. This is shown at block 304. Vehicle conditions, such as the accelerations, the wheel speeds, the engine speeds and the like, are filtered by the filters 212 and 216, and processed by the processors 116, as shown in block 308. The ECU 116 determines if a likely tire blowout has occurred at block 312. For example, if one of the wheels abruptly starts rotating at a different rate than the other three wheels, a tire blowout may have occurred. In some constructions, when the vehicle 100 travels at or above 40 miles per hour (mph), a decrease of 20 percent of wheel speed or 8 mph is considered a different wheel speed rate. In some other constructions, when the vehicle 100 travels at or above 40 mph, if the wheel speed drops at a rate greater than 50 mph per second, the wheel speed is also considered different. Of course, other wheel speed differences can also be used.

The ECU 116 can also use data from the tire pressure sensor to determine if the pressure in one of the tires abruptly changes. If one of the tire pressures abruptly changes and one of the wheel speeds abruptly starts rotating at a different rate, a tire blowout may have occurred. In some constructions, a decrease of 50 percent of tire pressure is considered a different tire pressure. In some other constructions, if the tire pressure drops at a rate greater than 100 psi per second, the tire pressure is also considered different. Of course, other tire pressure differences can also be used.

The ECU 116 also determines if there is a change in road wheel angle or road wheel torque without being caused by an initiating event from the driver's steering wheel, such as in the case of a likley tire blowout. If steering pressure data is used, the steering pressure data is processed to determine if a change in steering pressure has occurred without being caused by a change in engine speed or without an initiating event from the driver steering wheel.

In the case of a tire blowout, the ECU 116 or the third processor 220 activates a plurality of vehicle controls. In the construction shown, the third processor 220 activates a plurality of speed reduction devices at block 316, records vehicle data in the memory 224 at block 320, sends an emergency notification message at block 324, and locks the doors of the vehicle 100 at block 328. In some constructions, as shown at block 324, the ECU 116 sends an emergency notification message, such as a vehicle location, to a remote station to notify the station of the emergency. In some other constructions, as shown at block 324, the ECU 116 sends an emergency notification message, such as vehicle speeds before and after the tire blowout, to the memory 224, or some recording vehicle data. To reduce the speed of the vehicle, for example, the ECU 116 reduces the throttle using the throttle control 248 and apply the brakes with the brake application module 240, respectively. In some other constructions, however, the ECU 116 can maintain both the vehicle speed and the throttle by controlling the brake application module 240 and the throttle control 248, respectively. Thereafter, the ECU 116 can gradually lower speed as described earlier.

Thereafter, at block 332, the ECU 116 determines if the vehicle 100 is travelling at high speed, which may result in loss of vehicle control or cause vehicle rollover. In some constructions, a vehicle speed of 40 mph is considered high speed. Of course, other speeds can be used based on vehicle parameters. Particularly, the specific speed at which the tire blowout occurs is generally based on a number of factors such as, type of vehicle, a front tire blowout, a rear tire blowout, and the like. The high-speed threshold can therefore be calibratable for each specific vehicle and can be programmed into the ECU 116 based on, for example, vehicle design, customer requirements, and vehicle testing. Once a high speed has been detected, the ECU 116 can further activate the stability control module 228 at block 336. For example, the ECU 116 can selectively apply braking and provide steering assistance using the selective brake control 252 and the steering control 244, respectively.

The ECU 116 also processes a plurality of occupant information at block 340. For example, the ECU 116 determines if a seat of the vehicle 100 is occupied at block 344. If a seat is occupied, the ECU 116 can activate occupant protection devices at block 348. For example, the ECU 116 can lock the doors with the door lock control 264, deploy seat belt pretensioners with the seat belt control 256, and deploy air bags with the air bag activation control 260. In this way, the vehicle 100 can integrate both the stability control and the occupant protection with a single set of sensed data.

Therefore, the invention provides new and useful vehicle control systems and methods of operating the same. Various features and advantages of the invention are set forth in the following claims.

The invention claimed is:

1. A control system for a vehicle having multiple wheels, each of the wheels having a tire mounted thereon, the system comprising:

a first wheel speed sensor associated with the first wheel, the first wheel speed sensor configured to generate a first wheel speed signal indicative of a speed for the first wheel;

a second wheel speed sensor associated with the second wheel, the second wheel speed sensor configured to generate a second wheel speed signal indicative of a speed for the second wheel;

a first pressure sensor associated with the first tire, the first pressure sensor configured to generate a first pressure signal indicative of a tire pressure for the first tire;

a second pressure sensor associated with the second tire, the second pressure sensor configured to generate a second pressure signal indicative of a tire pressure for the second tire;

a first processor configured to receive the first and second wheel speed signals, and to generate a first processed signal when the first and second wheel signals indicate that the speed of the first wheel is different from the speed of the second wheel;

a second processor configured to receive the first and second pressure signals, and to generate a second processed signal when the first and second pressure signals indicate that the first tire has a pressure that is different from the pressure of the second tire; and a third processor configured to receive the first and second processed signals, to generate a tire blowout signal when both the first and second processed signals have been generated, and to activate at least one of an active safety system and a passive safety system with the tire blowout signal.

2. The system of claim 1, further comprising an angle sensor configured to generate an angle signal indicative of a roll angle of the vehicle, and wherein the third processor is further configured to receive the angle signal, and to determine if a tire blowout has occurred based on the angle signal.

3. The system of claim 1, further comprising a steering pressure sensor configured to generate a steering pressure signal indicative of a pressure applied to a steering wheel, and wherein the third processor is further configured to receive the steering pressure signal and to determine if a tire blowout has occurred based on the steering pressure signal.

4. The system of claim 1, wherein the active safety system comprises at least one of an anti-lock braking control, a stability control, a steering control, a throttle control, a selective braking control, and a transmission control.

5. The system of claim 4, wherein the third processor activates at least one of the anti-lock braking control, the stability control, the steering control, the throttle control, the selective braking control, and the transmission control.

6. The system of claim 1, further comprising a yaw rate sensor configured to generate a yaw rate signal indicative of a yaw rate of the vehicle, and wherein the third processor is further configured to receive the yaw rate signal and to determine if a tire blowout has occurred based on the yaw rate signal.

7. The system of claim 1, further comprising a lateral acceleration sensor configured to generate a lateral acceleration signal indicative of a lateral acceleration signal of the vehicle, and wherein the third processor is further configured to receive the lateral acceleration signal and to determine if a tire blowout has occurred based on the lateral acceleration signal.

8. The system of claim 1, wherein the passive safety system comprises at least one of a restraint system and a body electronics system.

9. A control system for a vehicle having multiple wheels, and each of the wheels having a tire mounted thereon, the system comprising:

means for sensing first and second wheel speeds associated with first and second wheels, respectively, and for generating a first and second wheel speed signals indicative of the first and second wheel speeds, respectively;

means for sensing first and second tire pressures associated with first and second tires, respectively, and for generating first and second tire pressure signals indicative of the first and second tire pressures, respectively;

means for processing the first and second wheel speed signals and the first and second tire pressure signals, for generating a tire blowout signal based on the first and second wheel speed signals and the first and second tire pressure signals, and for selectively activating at least one of an active safety system and a passive safety system based on the tire blowout signal.

10. The system of claim 9, further comprising means for generating an angle signal indicative of a roll angle of the vehicle, and wherein the means for processing, generating and selectively activating processes the angle signal, and generates the tire blowout signal based on the angle signal.

11. The system of claim 9, further comprising means for generating a steering pressure signal indicative of a pressure applied to a steering wheel, and wherein the means for processing, generating and selectively activating processes the steering pressure signal, and generates the tire blowout signal based on the steering pressure signal.

12. The system of claim 9, wherein the active safety system comprises at least one of an anti-lock braking control, a stability control, a steering control, a throttle control, a selective braking control, and a transmission control.

13. The system of claim 12, wherein the means for processing, generating and selectively activating activates at least one of the anti-lock braking control, the stability control, the steering control, the throttle control, the selective braking control, and the transmission control.

14. The system of claim 9, further comprising means for generating a yaw rate signal indicative of a yaw rate of the vehicle, and wherein the means for processing, generating and selectively activating processes the yaw rate signal, and generates the tire blowout signal based on the yaw rate signal.

15. The system of claim 9, wherein the passive safety system comprises at least one of a restraint system and a body electronics system.

16. A method for controlling a vehicle having multiple wheels, each of the wheels having a tire mounted thereon, the method comprising:

determining a wheel speed associated with each wheel;

determining a tire pressure associated with each tire;

generating a tire blowout signal when
  one of the wheel speeds is different from the other wheel speeds,
  one of the tire pressures is different from the other tire pressures, and
  zero or more other conditions exist; and activating at least one of a passive safety system and an active safety system in response to the tire blowout signal.

17. The method of claim 16, further comprising determining a roll angle of the vehicle, and wherein generating a tire blowout signal is further based on the angle.

18. The method of claim 16, further comprising determining a pressure applied to a steering wheel of the vehicle, and wherein generating a tire blowout signal is further based on the steering wheel pressure.

19. The method of claim 16, wherein the active safety system comprises at least one of an anti-lock braking control, a stability control, a steering control, a throttle control, a selective braking control, and a transmission control.

20. The method of claim 19, further comprising activating at least one of the anti-lock braking control, the stability control, the steering control, the throttle control, the selective braking control, and the transmission control.

21. The method of claim 16, further comprising receiving data from a yaw rate sensor configured to measure a yaw rate of the vehicle, and wherein generating a tire blowout signal is further based on the yaw rate of the vehicle.

22. The method of claim 16, further comprising receiving data from a lateral acceleration sensor configured to measure a lateral acceleration of the vehicle, and wherein generating a tire blowout signal is further based on the lateral acceleration.

23. The method of claim 16, wherein the passive safety system comprises at least one of a restraint system and a body electronics system.

* * * * *